United States Patent [19]

Polidor

[11] Patent Number: 4,877,705

[45] Date of Patent: Oct. 31, 1989

[54] PLASMA SPRAY COATED CERAMIC BODIES AND METHOD OF MAKING SAME

[75] Inventor: Jaromir J. Polidor, Pittsburgh, Pa.

[73] Assignee: Vesuvius Crucible Company, Pittsburgh, Pa.

[21] Appl. No.: 163,669

[22] Filed: Mar. 3, 1988

[51] Int. Cl.$^4$ ............................ B05D 1/08; B32B 9/00
[52] U.S. Cl. ..................................... 428/34.6; 222/591;
428/212; 428/312.6; 428/312.8; 428/408;
428/699; 428/701; 428/336
[58] Field of Search ................. 428/36, 212, 217, 698,
428/699, 701, 703, 408, 220, 312.6, 312.8, 336,
34.6; 427/34; 222/591

[56] References Cited

U.S. PATENT DOCUMENTS

| | | | |
|---|---|---|---|
| 3,806,357 | 4/1974 | Halley et al. | 427/34 |
| 4,226,914 | 10/1980 | Terner et al. | 427/34 |
| 4,313,975 | 2/1982 | Mairy | 427/236 |
| 4,330,568 | 5/1982 | Boehm et al. | 427/34 |
| 4,542,111 | 9/1985 | Buran et al. | 501/127 |
| 4,548,832 | 10/1985 | Woodhead et al. | 427/34 |
| 4,576,874 | 3/1986 | Spengler et al. | 427/34 |
| 4,599,242 | 7/1986 | Brooker et al. | 427/34 |
| 4,645,716 | 2/1987 | Harrington et al. | 428/472 |
| 4,649,858 | 3/1987 | Sakai et al. | 118/697 |

Primary Examiner—Ellis P. Robinson
Assistant Examiner—James J. Seidleck
Attorney, Agent, or Firm—Webb, Burden, Ziesenheim & Webb

[57] ABSTRACT

The corrosion and erosion resistance of ceramic bodies, such as submerged pouring shrouds and nozzles, exposed to molten steel and slag during continuous casting, is improved by applying a layer of a ceramic material to the exposed surfaces by plasma spraying. The apparent porosity of the coating is at least 15% lower than that of the ceramic body. Corrosion and erosion resistant material suitable for such plasma sprayed coatings on alumina-graphite and zirconia-graphite bodies include one or more as mixtures or compounds of the following: zirconia; chromium oxide; alumina; silica; magnesia; zirconium silicate; and titanium oxide. A corrosion and erosion resistant coating system for fused silica, which is also resistant to thermal cracking, includes an outer coating of a plasma sprayed ceramic material, such as zirconia, and one or more intermediate layers of plasma sprayed material containing varying amounts of zirconium silicate.

7 Claims, 1 Drawing Sheet

PLASMA SPRAY COATED CERAMIC BODIES AND METHOD OF MAKING SAME

BACKGROUND OF THE INVENTION

The present invention relates generally to ceramic bodies and, more particularly, to plasma sprayed coatings for the purpose of increasing the corrosion and erosion resistance of these ceramic bodies in molten metal and slag environments.

In the continuous casting of steel, special high refractory ceramic parts are employed to control the flow of molten metal and to protect the metal from oxidation as it is poured from ladles to tundishes and thence to the continuous casting molds. These refractory components include slide gate plates and stopper rods used in molten metal flow control, various collector nozzles in ladles and tundishes, and protective ladle shrouds and submerged pouring nozzles and subentry shrouds employed to protect the molten steel from oxidation. These specialty ceramic parts are subjected to harsh operating conditions such as severe thermal shock at casting start-up, molten steel erosion and slag corrosion attack. All of these aforementioned ceramic parts are either continuously or periodically exposed to the severe corrosive and erosive effects of the molten metal with the most severe attack occurring on the outer surfaces of the submerged shrouds and nozzles which are in direct contact with the highly corrosive molten slag layer, commonly referred to as the "slagline" area. It is, of course, extremely undesirable, from an economic standpoint, to shut down a continuous casting sequence due to the premature failure of a submerged pouring nozzle or subentry shroud. It is, therefore, highly desirable to extend the service life of these ceramic nozzles and shrouds so as to maximize casting sequence times and resulting process economics.

Heretofore the problems connected with cracking, spalling, corrosion and erosion of these ceramic parts has to a degree been somewhat decreased through the use of highly resistant materials such as stabilized zirconia ($ZrO_2$)/graphite or magnesium oxide (MgO). These materials are, however, significantly more costly than more commonly used alumina graphite or fused silica ($SiO_2$).

It is a known practice in the materials science/ceramics art to manufacture refractory bodies, such as a submerged pouring nozzle, for example, as a composite structure in order to increase the service life of the nozzle. The body of the nozzle may be of a carbon bonded alumina and graphite refractory material with an erosion resistant, intermediate sleeve section formed of carbon bonded zirconia and graphite refractory. The body and sleeve are co-pressed in powder form and then fired. The intermediate sleeve section is located in the region where the submerged nozzle is in contact with the slag/metal interface. The co-pressed zirconia-graphite sleeve section exhibits improved slag erosion resistance compared with nozzles which are entirely of carbon-bonded alumina-graphite refractory. Conventional carbon bonded zirconia and graphite slagline sleeves, while offering high erosion resistance, unfortunately often lose mechanical strength and fracture during long casting sequences. Such premature failure results in a shortened casting sequence which is uneconomical and is particularly burdensome since the nozzle must usually be replaced prior to its projected erosion life. It has been observed that the fractured sleeve still contains a large proportion of refractory which has not been eroded but becomes useless due to the decreased mechanical strength caused by a crystallographic change in the structure of known zirconia-graphite refractories. Thus, in the case of the submerged pouring nozzle, it would be beneficial if the useful service life of a slagline sleeve could be increased by avoiding the phase transformation cracking while, at the same time, retaining a high resistance to slag erosion during service.

It has also been observed that the corrosion and erosion resistance can be increased by decreasing the porosity of the ceramic body to improve attack against gaseous and liquid phases at high temperatures. Unfortunately, when the porosity of a ceramic body is increased to improve corrosion and erosion properties, there is generally a corresponding decrease in the thermal shock properties of the body. Finding a compromise solution to this perplexing problem has heretofore been an elusive goal for those skilled in the materials science/ceramics art.

My invention solves this problem by providing a coating of a ceramic material to the outer surface of the ceramic body, such as an alumina-graphite subentry nozzle, wherein the coating has a lower porosity than the body. In this manner, the erosion and corrosion resistance of the low porosity surface facing the molten slag and metal is increased while the remaining physical properties of the body, such as thermal shock resistance, remain unimpaired by the lower porosity coating.

In addition, the present invention provides a coating for ceramic bodies which not only is more resistant to the corrosive and erosive effects of molten slag and steel but also resists thermal stress cracking problems, particularly in conjunction with low thermal expansion ceramic bodies, such as, for example, fused silica bodies which exhibit little, if any, thermal expansion.

SUMMARY OF THE INVENTION

Briefly stated, the above-desired objectives are obtained through the use of a plasma sprayed coating or coatings of selected ceramic materials. The present invention thus pertains to a method of increasing the refractory properties of heat-resistant ceramic bodies and to the resulting product, especially nozzles, shrouds, stoppers and seats used in the continuous casting of steel. Higher corrosion and erosion resistance of these plasma sprayed coatings are obtained by controlling the porosity of the coatings to a level significantly below that of the body. Such coatings preferably consist essentially of materials selected from the group consisting of zirconia ($ZrO_2$); alumina ($Al_2O_3$); silica ($SiO_2$); magnesia (MgO); zirconium-silicate or zircon ($ZrSiO_4$); titanium oxide ($TiO_2$); chromium oxide ($Cr_2O_3$); and combinations or compounds thereof in effective thicknesses from about 0.5 mm to 5 mm. The corrosion/erosion rate of these coatings in the molten steel and molten slags is at least about 1.5 times lower than that of the ceramic bodies when the apparent porosity of the coating is at least about 15% lower than the apparent porosity of the ceramic body. Such coatings are applied to the external areas of the body where the most severe corrosion, erosion or wear occurs, such as slagline areas of subentry shrouds and nozzles, or at the seats or functional tips of stoppers.

More specifically, a presently preferred embodiment of the invention comprises a plasma sprayed coating consisting essentially of stabilized zirconia material applied to the outer surface of a submerged entry nozzle body of a carbon-bonded alumina-graphite composition or a body having a carbon-bonded zirconia-graphite composition or a body of a fused silica composition.

A still further presently preferred embodiment comprises a subentry nozzle or shroud of fused silica ceramic material having a plasma sprayed coating applied in the slagline area including a first, or intermediate coating layer adjacent the body consisting essentially of zircon ($ZrSiO_4$) and a second, outer layer consisting essentially of stabilized zirconia material. The intermediate coating layer of zircon material provides a transition zone for thermal expansion between the low expansion fused silica body and the higher expansion, erosion and corrosion resistant stabilized zirconia outer coating. Alternatively, a plurality of layers having a compositional gradient, proceeding from a mixture rich in zircon adjacent the fused silica body to an outer layer rich in zirconia with little or no zircon is also employed.

BRIEF DESCRIPTION OF THE DRAWINGS

These and other features of the present invention will become more apparent when reference is made to the following description and claims when taken with the accompanying drawings, in which:

DETAILED DESCRIPTION OF THE INVENTION

Figures 1, 2:
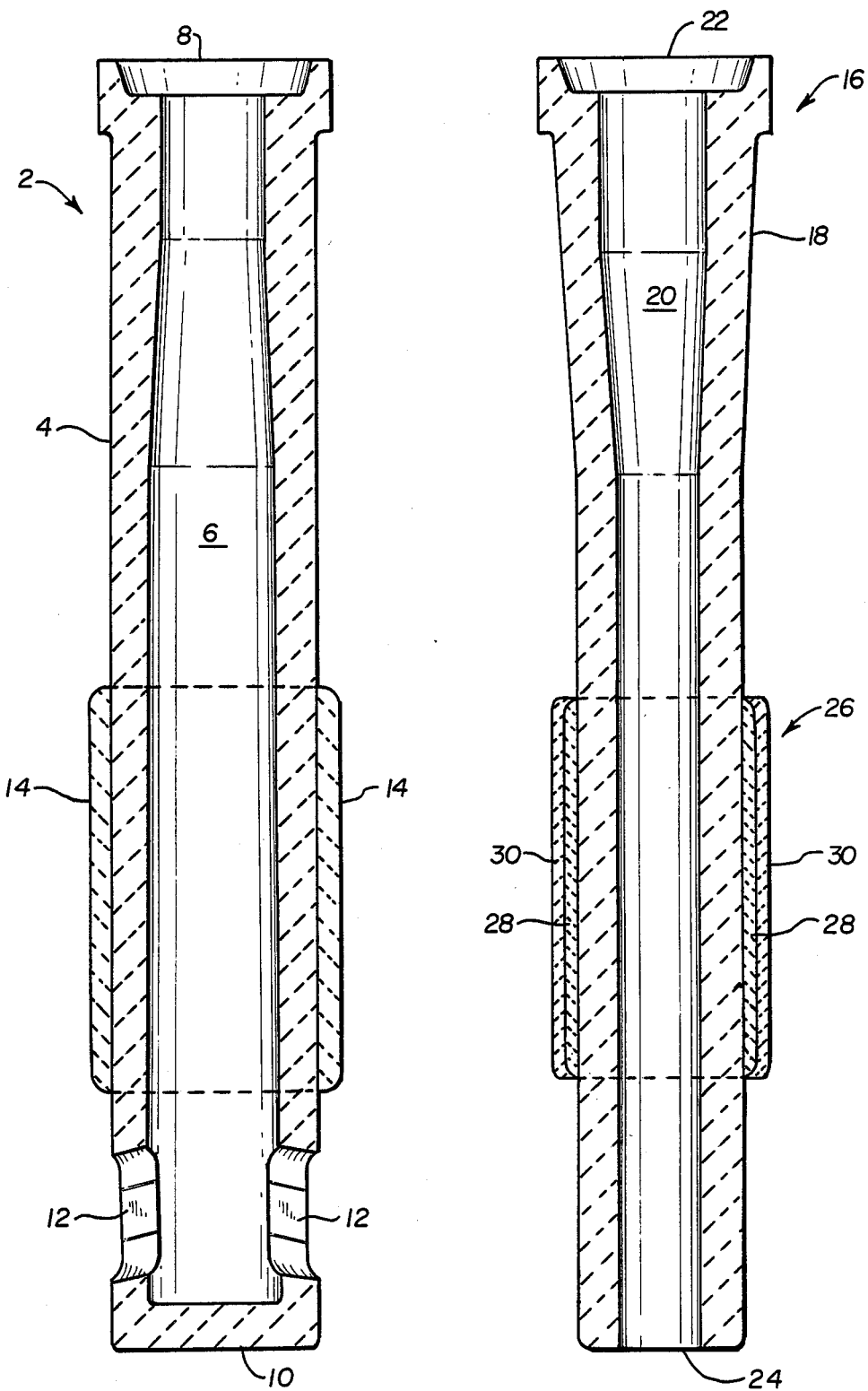
FIG. 1 is a cross-sectional side elevational view of a subentry shroud of the present invention with a plasma sprayed coating in place around the slagline area thereof.
FIG. 2 is a further preferred embodiment of the present invention similar to FIG. 1, but having an intermediate coating layer between the shroud body and the outer coating.

Referring to the drawings, FIG. 1 depicts a subentry shroud or nozzle 2 having a plasma sprayed coating 14 in accordance with the present invention. In the drawings the coating 14 is somewhat enlarged. The immersion nozzle or subentry shroud 2 is a side discharge type and is utilized in the continuous casting of steel. Shroud 2 transfers molten metal from a tundish to a continuous coating mold (not shown), all in a well-known manner. The shroad 2 comprises a body 4 of a ceramic composition such as conventional alumina-graphite, zirconia graphite, fused silica, or other known materials possessing the desirable properties of thermal shock resistance as well as resistance to the corrosive and erosive attack of molten steel. The body 4 has a bore 6 formed therein which is adapted to communicate with the bottom of a tundish at inlet portion 8 in a conventional manner utilizing, for example, slide gate plate flow control valving or a stopper rod. A pair of discharge ports 12 are formed at the lower end 10 of the nozzle body 4. In use, molten steel enters the nozzle 2 at the upper end 8, passes through the bore 6 and is discharged beneath the surface of the molten metal in the mold via ports 12. In the area of the nozzle body above the discharge ports 12, the exterior surface of the nozzle is in direct contact with a layer of molten powder and a subjacent layer of molten slag which is flat on the surface of the molten steel at the so-called slagline or powder line area. Both the mold powder and slag layers are observed to be highly erosive and corrosive to refractory materials commonly used in the manufacture of the nozzle body 4, such as alumina-graphite, zirconia-graphite or fused silica.

According to the present invention, a layer 14 of plasma sprayed ceramic material is deposited on the outer surface of the nozzle body 4 to form a slagline sleeve along the surface of the nozzle which is in contact with the molten slag and mold powder during casting. The plasma sprayed slagline sleeve 14 is about 10 inches in length and is applied in a thickness of between about 0.5 mm to about 5 mm. The plasma sprayed material 14 preferably has an apparent porosity of at least about 15% to 50% lower than the porosity of the ceramic body 4. The plasma sprayed coating is applied using conventional plasma spray equipment and employs argon or nitrogen as a primary gas. Hydrogen or helium may also be employed as a secondary plasma gas, if used. The temperature of the ceramic body is also controlled during the coating spraying operation to a temperature of below about 300° C. and more preferably below about 250° C. with a spraying distance of between about 2 inches (50 mm) to about 5 inches (125 mm), as measured from the outer surface of the ceramic body to the plasma gun nozzle.

The coating 14 is comprised of a ceramic material which is resistant to the corrosion and erosion effects of molten slag, mold powder and steel which possesses a thermal expansion coefficient compatible with that of the body 4 so as to avoid cracking of the coating 14 during casting start-up. Suitable ceramic powder materials for use as plasma spray coating 14 according to the present invention are one or more of the following, zirconia ($ZrO_2$); alumina ($Al_2O_3$); silica ($SiO_2$); chromium oxide ($Cr_2O_3$); magnesia (MgO); zirconia silicate ($Zr SiO_4$); titanium oxide ($TiO_2$); and mixtures or compounds thereof for example, spinels. Yttrium oxide ($Y_2O_3$), cerium oxide ($CeO_2$), and calcia (CaO) may be employed as stabilizing additions to the zirconia powder, if desired.

In order to compare the plasma sprayed coating of the present invention with alumina-graphite and zirconia-graphite materials commonly used as body 4 in submerged nozzle 2, a number of samples were prepared and evaluated as reported in Table II. Base material substrates of commercially available alumina-graphite and zirconia-graphite commonly used in immersion nozzles having a typical composition shown in Table I were prepared.

TABLE I

|  | Alumina-Graphite | Zirconia-Graphite |
| --- | --- | --- |
| C | 32 (weight %) | 16.5 (weight %) |
| $Al_2O_3$ | 52 (weight %) | 1.0 (weight %) |
| $SiO_2$ | 14 (weight %) | 2.0 (weight %) |
| Minor | 2 (weight %) | 1.5 (weight %) |
| $ZrO_2$ | — | 75.0 (weight %) |
| CaO | — | 4.0 (weight %) |

The alumina-graphite and zirconia-graphite base materials were plasma spray coated with various stabilized zirconia materials under various coating conditions as set forth in Table II. Sample tubes were isopressed, fired and sprayed. The coated samples were subjected to immersion testing in the laboratory. The laboratory test consisted of rotating the test pieces at 20 RPM in a molten steel bath having a layer of molten mold powder/slag floating thereon. Upon completion of the tests, which ranged between 5 to 10 minutes in duration, the depth of slag erosion/corrosion was measured on the plasma coating and on the base material. These test results are reported in Table III.

graphite base materials in sample No. 8. In this example, a ceramic tube of zirconia-graphite having a composi-

TABLE II

| SAMPLE NO. | BASE MATERIAL | COATING MATERIAL | COATING THICKNESS (mm) | ARC CURRENT (A) | ARC VOLTAGE (V) | PLASMA GASES | SPRAY RATE Kg/hr. | SPRAY DISTANCE (inch.) |
|---|---|---|---|---|---|---|---|---|
| 1 | ALUM-GR | $ZrO_2/CaO$ | 0.5 | 700 | 40 | Ar | 3 | 4½ |
| 2 | ALUM-GR | $ZrO_2/Al_2O_3$ | 0.5 | 510 | 70 | $Ar/H_2$ | 2.6 | 4½ |
| 3 | ALUM-GR | $ZrO_2/Y_2O_3$ | 1.0 | 900 | 40 | Ar/He | 1.2 | n/a |
| 4 | ALUM-GR | $ZrO_2/Y_2O_3/CeO_2$ | 1.0 | 500 | 80 | $N_2/H_2$ | 3 | 4½ |
| 5 | ZIRC-GR | $ZrO_2/CaO$ | 0.5 | 700 | 40 | Ar | 3 | 4½ |
| 6 | ZIRC-GR | $ZrO_2/CaO$ | 0.5 | 700 | 40 | Ar | 3 | 4½ |
| 7 | ZIRC-GR | $ZrO_2/CaO$ | 0.5 | 510 | 70 | $Ar/H_2$ | 3 | 4½ |
| 8 | ZIRC-GR | $ZrO_2/Y_2O_3$ | 1.0 | 900 | 40 | Ar/He | 1.2 | n/a |
| 9 | ZIRC-GR | $ZrO_2/Y_2O_3$ $CeO_2$ | 1.0 | 500 | 80 | $N_2/H_2$ | 3 | 3 |

TABLE III

| SAMPLE NO. | STEEL TEMPERATURE (°C.) | CORROSION/EROSION RATE (mm/min) | |
|---|---|---|---|
| | | COATING | BASE |
| 1 | 1610–1670 | 0.08 | 0.30 |
| 2 | 1550 | 0.15 | 0.20 |
| 3 | 1600 | 0.30 | 0.30 |
| 4 | 1650 | 0.35 | 0.35 |
| 5 | 1610–1670 | 0.15 | 0.20 |
| 6 | n/a | 0.13 | 0.41 |
| 7 | 1550 | 0.10 | 0.23 |
| 8 | 1600 | 0.18 | 0.38 |
| 9 | 1600 | 0.17 | 0.29 |

From the corrosion/erosion measurements reported in Table III, it is observed that the plasma sprayed coatings generally proved superior to the alumina-graphite and zirconia-graphite base material which in themselves, are considered in the art to offer good resistance to such attack. Several representative superior samples are discussed in greater detail below.

Sample No. 1

Of interest is sample No. 1 which represents a pouring nozzzle made of alumina-graphite base material of a composition set forth in Table I and having an apparent porosity of 17%. Apparent porosity is conveniently determined using standard, known testing procedures such as ASTM C830-83. The plasma coating material was a calcia stabilized zirconia powder supplied by Bay State Abrasives, under product designation No. PP-42B. The powder contained approximately 92–94% $ZrO_2$ and 5% CaO and had an apparent density of 7% after spraying. The coating was applied to the base material in a thickness of 0.5 mm using a PG-Plasma Gun of Bay State Abrasives under the spraying conditions set forth in Table II. The temperature of the base material was held below 260° C. during spraying to prevent cracking. The coated system of sample No. 1 was tested against molten steel and slag attack (1020 low carbon steel), slag-mold powder composition: $SiO_2$-38.4%, $Al_2O_3$-3.6%, CaO-37.2%, $Na_2O/K_2O$-80%, F-8.7%, C 4.9%. The temperature of the steel-slag system was in the range 1610°–1670° C. The corrosion-/erosion rate of the coating was found to be 0.08 mm/min. while the corrosion/erosion rate of the reference uncoated alumina-graphite tube tested simultaneously under the same conditions was 0.30 mm/min.

Sample No. 8

Also exemplary of the improved performance of a plasma sprayed coating in connection with a zirconia-graphite base materials in sample No. 8. In this example, a ceramic tube of zirconia-graphite having a composition set forth in Table I and an apparent density of about 15.5% was coated with a plasma sprayed layer of yttria stabilized zirconia. The coating powder material, marketed under the trademark "AI-1075" contained about 8% $Y_2O_3$ and the balance essentially $Zr_2O_3$. The coating was applied using a model SG-100 Plasmadyne plasma spray gun under the spraying conditions set forth in Table II. The temperature of the base material was held below about 230° C. during the plasma spraying operation. The finished coating had a depth of 1.0 mm and exhibited an apparent porosity of about 6%. The coated system of sample No. 8 was tested against molten steel and slag attack having the same compositions as in sample No. 1 described above. The temperature of the steel-slag system was measured in the range of 1650°–1700° C. The corrosion/erosion rate of the coating was found to be 0.18 mm/min. while the corrosion/erosion rate of the reference uncoated zirconia-graphite tube tested simultaneously under the same conditions was noted as 0.38 mm/min.

Fused Silica Example

A further test was conducted on a base material of fused silica. The ceramic tube made of fused silica with porosity 11% was plasma coated using 8% yttria stabilized zirconia as the material of the coating. The length of the coating was 75 mm and the thickness of the coating was 1.0 mm. Porosity of the coating was 7%. The coating was applied using the arc current intensity 500 A, arc voltage 75 V, nitrogen and hydrogen as plasma gas and powder spray rate 2.3kg/hour. The temperature of the sprayed piece was held below 270° C. The coated system was tested against molten steel and slag attack (steel composition: C - 0.07%, S1 - 0.02%, Mn - 0.33%, P 0.01%, S-0.019%, Al-0.044%, slag composition: $SiO_2$- 31.2%, CaO-25.1%, MgO-0.3%, $Al_2O_3$-6.8%, $TiO_2$-N.A., $Fe_2O_3$-0.3%, MnO-0.1%, $Na_2O$-4.5%, $K_2O$-0.3%, F-5.0%, $CO_2$6.8%, C Total 20.8%). the corrosion rate of the coating was three times lower than that of the uncoated fused silica tube at a steel temperature of 1550° C.

While the above test involving a fused silica pouring tube indicates that the corrosion and erosion resistance and, hence, service life of a fused silica body can be improved using a plasma sprayed coating such as stabilized zirconia, it is believed that the very low expansion characteristics of fused silica may create cracking problems due to the significant differences in the coefficients of expansion of the body material and the coatings. By way of example, it is known that zirconia has a much higher coefficient of thermal expansion than fused silica, which is about zero. Thus, while stabilized zirconia offers promising results as a corrosion/erosion coating barrier for a fused silica substrate, it may have potential problems with respect to thermal cycling and potential cracking. This problem is overcome by the embodiment depicted in FIG. 2.

A subentry shroud or immersion nozzle, generally designated 16, is depicted in the drawings in which the body 18 is composed of fused silica material. The tube-shaped nozzle 16 has a through bore 20 for passage of molten steel from an upper end 22 which communicates with a tundish (not shown) for transfer to a lower end 24 and subsequent delivery to a continuous casting mold. Nozzle 16 also is a submerged type pouring tube and delivers the molten metal with the outlet 24 thereof positioned below the surface of the metal slagline interface. In order to accommodate the significant difference in the coefficients of thermal expansion between the fused silica body 18 and a plasma sprayed coating material, such as stabilized zirconia layer 30, a transitional, plasma sprayed layer 28 having a coefficient of expansion intermediate that of body 18 and outer coating 30 is employed. In this manner, thermally induced cracking of the outer coating layer 30 is minimized. The invention contemplates an intermediate transitional layer 28 of plasma sprayed zirconium silicate ($ZrSiO_4$), also known as zircon. By way of comparison, fused silica has a coefficient of thermal expansion of essentially zero while the coefficient for zircon is about one half that for stabilized zirconia. Thus, in use, the intermediate layer 28 of plasma sprayed zircon provides a transitional buffer zone to accommodate the greater expansion occurring in the outer layer 30 of the corrosion/erosion resistant plasma sprayed coating of stabilized zirconia.

The intermediate layer 28 of zircon material is applied by plasma spraying in the manner set forth above, preferably in a thickness of about 0.1 mm to 0.5 mm. The outer corrosion/erosion resistant layer 30 forming the slagline sleeve is preferably of a stabilized zirconia plasma sprayed material, applied in a thickness of between about 0.5 mm to 5.0 mm. Once again, as a result of the plasma spraying process, the porosity of the sprayed coating layer 30 is less than the porosity of the pressed and fired ceramic body 18 whereby improved erosion/corrosion resistance to molten slag and steel is achieved.

Alternatively a plurality of plasma sprayed layers can be applied between the zircon intermediate layer and the outer zirconia layer. Each layer comprises a mixture of zircon and zirconia with varying amounts of each constituent so as to establish a compositional gradient rich in zircon near the fused silica body to a layer rich in zirconia at the outer surface. For example, in such an approach, a first layer adjacent the fused silica body contains 100% zircon. A second layer contains about 75% zircon and 25% zirconia. A third layer contains about 25% zircon and 75% zirconia with a fourth outer layer containing essentially 100% zirconia. Each of these layers except the outer layer are on the order of between about 0.1 mm to 0.5 mm in thickness.

Hence, it is appreciated that the service life of commercially available pouring nozzles and other components of alumina-graphite, zirconia-graphite and fused silica can be significantly increased by the plasma sprayed coating.

While specific embodiments of the invention have been described in detail, it will be appreciated by those skilled in the art that various modifications and alternatives to those details could be developed in light of the overall teachings of the disclosure are meant to be illustrative only and not limiting as to the scope of the invention which is to be given the full breadth of the appended claims and any and all equivalents thereof.

What is claimed is:

1. A subentry shroud or nozzle for use in delivering molten metal below the surface of a molten slag layer in a continuous casting mold, comprising:

an elongated body member of a compacted and fired ceramic material having an internal bore extending from a first end to a second end thereof for delivering a flow of molten metal from said first end to said second end below the surface of said bath of molten material, said body member also having an outer sidewall surface extending between said first and second ends, a portion of said outer surface adapted to contact the surface of said molten slag layer and defining a slagline area therearound; and a plasma sprayed layer of a ceramic material coating said outer surface of the body in said slagline area, said plasma sprayed layer having a thickness of between about 0.5 mm to about 5.0 mm and an apparent porosity of at least 15% lower than an apparent porosity of said body, whereby said plasma sprayed layer is adapted to resist corrosive and erosive attack of the molten slag layer at an attack rate lower than that of the body member.

2. The subentry shroud or nozzle of claim 1, wherein the body is an alumina-graphite material and said plasma sprayed coating is stabilized zirconia.

3. The subentry shroud or nozzle of claim 1, wherein the plasma sprayed coating consists essentially of one or more materials selected from the group consisting essentially of mixtures and compounds thereof, consisting of: zirconia, chromium oxide; alumina; silica; magnesia; zirconium silicate; and titanium oxide.

4. The subentry shroud or nozzle of claim 1, wherein the elongated body is a ceramic material consisting essentially of a member selected from the group consisting essentially of alumina-graphite, zirconia-graphite, and fused silica.

5. The subentry shroud or nozzle of claim 4 wherein the body consists essentially of alumina-graphite and the plasma sprayed layer consists essentially of zirconia.

6. The subentry shroud or nozzle of claim 1, wherein the body consists essentially of zirconia-graphite and the plasma sprayed layer consists essentially of zirconia.

7. A subentry shroud or nozzle for use in delivering molten metal below the surface of a molten slag layer in a continuous casting mold, comprising:

an elongated body member of a compacted and fired fused silica material having an internal bore extending from a first end to a second end thereof for delivering a flow of molten metal from said first end to said second end below the surface of said bath of molten material, said body member also having an outer sidewall surface extending between said first and second ends, a portion of said outer surface adapted to contact the surface of said molten slag layer and defining a slagline area therearound;

a plasma sprayed layer consisting essentially of zirconia coating said outer surface of the body in said slagline area, said plasma sprayed layer having an apparent porosity of at least 15% lower than an apparent porosity of said body, whereby said plasma sprayed layer is adapted to resist corrosive and erosive attack of the molten material at an attack rate lower than that of the body member; and at least one plasma sprayed intermediate layer containing some quantity of zirconium silicate positioned between said fused silica body and said corrosion and erosion resistant zirconia outer layer, whereby in use, said at least one intermediate layer is adapted to provide a transition in thermal expansion between the body member and the outer layer to minimize thermal induced cracking in said outer layer.

* * * * *

UNITED STATES PATENT AND TRADEMARK OFFICE
CERTIFICATE OF CORRECTION

PATENT NO. : 4,877,705
DATED : October 31, 1989
INVENTOR(S) : Jaromir J. Polidor It is certified that error appears in the above-identified patent and that said Letters Patent is hereby corrected as shown below:

Column 3 Line 63 after "molten" insert --mold--.

Column 8 Line 2 after "disclosure" insert --. Accordingly, the particular arrangements disclosed--.

Signed and Sealed this

Tenth Day of December, 1991

Attest:

HARRY F. MANBECK, JR.

*Attesting Officer*  *Commissioner of Patents and Trademarks*